United States Patent [19]
Miller

[11] Patent Number: 6,064,178
[45] Date of Patent: May 16, 2000

[54] BATTERY CHARGE BALANCING SYSTEM HAVING PARALLEL SWITCHED ENERGY STORAGE ELEMENTS

[75] Inventor: David Lowell Miller, Canton, Mich.

[73] Assignee: Ford Motor Company, Dearborn, Mich.

[21] Appl. No.: 09/073,943

[22] Filed: May 7, 1998

[51] Int. Cl.[7] ......................... H01M 10/44; H01M 10/46
[52] U.S. Cl. ............................................. 320/117; 320/118
[58] Field of Search ..................................... 320/116, 117, 320/118, 119, 120, 122, 126, 127, 128, 137

[56] References Cited

U.S. PATENT DOCUMENTS

| | | |
|---|---|---|
| 3,202,900 | 8/1965 | McGivern . |
| 3,980,940 | 9/1976 | Mabuchi et al. . |
| 3,997,830 | 12/1976 | Newell et al. . |
| 4,079,303 | 3/1978 | Cox . |
| 4,238,721 | 12/1980 | DeLuca et al. . |
| 4,614,905 | 9/1986 | Petersson et al. . |
| 4,616,170 | 10/1986 | Urstoger . |
| 5,003,244 | 3/1991 | Davis, Jr. . |
| 5,063,340 | 11/1991 | Kalenowsky . |
| 5,153,496 | 10/1992 | LaForge . |
| 5,177,425 | 1/1993 | Goto . |
| 5,283,512 | 2/1994 | Stadnick et al. . |
| 5,387,857 | 2/1995 | Honda et al. . |
| 5,488,282 | 1/1996 | Hayden et al. . |
| 5,498,950 | 3/1996 | Ouwerkerk . |
| 5,504,415 | 4/1996 | Podrazhansky et al. . |
| 5,565,759 | 10/1996 | Dunstan . |
| 5,578,914 | 11/1996 | Morita . |
| 5,592,067 | 1/1997 | Peter et al. . |
| 5,594,320 | 1/1997 | Pasholok et al. . |
| 5,631,534 | 5/1997 | Lewis . |
| 5,710,504 | 1/1998 | Pascual et al. . |
| 5,814,970 | 9/1998 | Schmidt ................................ 320/119 X |
| 5,821,729 | 10/1998 | Schmidt et al. ......................... 320/126 |

FOREIGN PATENT DOCUMENTS

| | | |
|---|---|---|
| 0 432 640 A2 | 12/1990 | European Pat. Off. . |
| 2 293 059 | 3/1996 | United Kingdom . |
| WO 07/16879 | 5/1997 | WIPO . |
| WO 97/44877 | 11/1997 | WIPO . |

Primary Examiner—Edward H. Tso
Attorney, Agent, or Firm—Mark S. Sparschu

[57] ABSTRACT

A method for balancing charge of a plurality of series-connected batteries includes alternately coupling each of a plurality of energy storage circuits across a respective one of the batteries and in parallel with each other. A charge balancing system comprises a plurality of series connected batteries and a plurality of energy storage circuits. The system also includes switching circuitry for alternately connecting each energy storage circuit across a respective one of the batteries and in parallel with each other. The switching circuitry can also be controlled to couple a plurality of the energy storage circuits across a relatively-highly-charged battery and then across a relatively-weakly-charged battery.

17 Claims, 1 Drawing Sheet

BATTERY CHARGE BALANCING SYSTEM HAVING PARALLEL SWITCHED ENERGY STORAGE ELEMENTS

BACKGROUND OF THE INVENTION

1. Field of the Invention

The present invention relates to systems and methods for balancing the charges of a plurality of batteries.

2. Description of the Related Art

In applications where a plurality of batteries are used as a means of energy storage, imbalances in the states of charge of the batteries can result from a number of causes. For example, batteries can have a "self-discharge" which is a function of the battery temperature, with warmer batteries typically exhibiting greater self-discharge rates than cooler batteries. As a result, warmer batteries will over time exhibit a lower state of charge than cooler batteries. Additional factors, such as manufacturing variation, age of the batteries and others can also have an effect on the self-discharge rate of batteries.

Imbalances in the states of charge of batteries are disadvantageous. Where a battery pack comprising a plurality of series-connected batteries is used, as is typical for example in an electric vehicle, the energy delivery capability of the battery pack is limited by the battery with the lowest state of charge. When that battery is exhausted, the practical capability of the battery pack to continue delivering energy is exhausted. This is true although all of the other batteries in the battery pack may not yet be exhausted. Thus, imbalances in states of charge of batteries impairs the ability of the batteries to deliver energy to their fullest capability.

A number of methods of balancing states of charge of batteries have been proposed. Several of the methods are employed when the batteries are being charged. One such method involves simply charging the batteries with a constant series current until all of the batteries are fully charged. A considerable disadvantage of this method is that the batteries with higher states of charge when the charging process begins will continue receiving current after they are fully charged. This can have a negative effect on battery durability. Also, the heat generated while current is sourced through a fully-charged battery can cause temperature gradients between the batteries in a battery pack. Temperature gradients between batteries are disadvantageous because, for at least the reason discussed above, they promote differing rates of self-discharge between the batteries.

A second charge-balancing method which has been proposed for use while batteries are being charged involves charging the batteries with a relatively high series current until one of the batteries is fully charged. The charging current is then reduced to a trickle current until the remaining batteries are charged. Although this method may help reduce the battery life and temperature gradient problems just discussed, those problems will still be present. Further, reducing the charge current to a trickle can result in a very large charge time for all of the batteries to be fully charged. Particularly in an electric vehicle, short charge times are a very important feature.

A third charge-balancing method which has been proposed for use while batteries are being charged again involves charging the batteries with a relatively high series current until one of the batteries is fully charged. Means are provided to then shunt the charge current around this fully charged battery such that only the other batteries continue to receive charge current. As batteries successively reach full charge, the charge current is shunted around them as well. The charge process is complete when the final battery has reached full charge. U.S. Pat. 3,980,940, issued to Mabuchi et al., discloses such a charge-balancing method. Although this method helps address the disadvantages of the first two methods, it has disadvantages of its own. For example, the shunt components consume energy, so inefficiencies are introduced. Also, shunt components generate heat.

A further disadvantage of any charge-balancing system which operates only when the batteries are being charged should also be noted. Under some operating regimens, the batteries may often not be left "on charge" until the batteries are all fully charged. In such cases, a charge balancing scheme which operates only when the batteries are being charged cannot fully balance the charges of the batteries.

Another charge-balancing method is disclosed in the '940 patent. In the '940 patent, means are provided to discharge all of the batteries to a common point of deep discharge immediately prior to the beginning of battery charging. Although this method may reduce charge imbalances, it also lengthens the total time required for battery charging. This is so because the battery charging event now also includes the discharging which occurs immediately prior to charging. Also, if the battery pack is connected to the charger for only a short period of time, the battery pack may actually have less energy-delivery capability than before being connected to the charger. This would occur because all of the batteries in the battery pack, including the most-discharged battery, would necessarily be discharged to a very low value (below the normal operating range of the batteries) in order to assure balancing prior to charging. A system wherein the batteries can have less energy-delivery capability after a period of time connected to a charger may prove unsatisfactory in the view of a customer.

Thus, a battery charge-balancing method which substantially reduces or avoids the need to provide charge currents to fully-charged batteries; which can be performed energy efficiently and without generating substantial heat; which does not have an adverse impact on battery charging times; which does not depend solely upon the vehicle being "on charge" until all batteries are fully charged for charge balancing to be performed; and which does not discharge the batteries immediately before charging will provide advantages over the prior art.

SUMMARY OF THE INVENTION

The present invention provides a method for balancing charge of a plurality of series-connected batteries. The method comprises (a) coupling each of a plurality of energy storage circuits across a respective one of the batteries; (b) coupling the plurality of energy-storage circuits in parallel with one another; and (c) alternately repeating steps (a) and (b).

The present invention further provides a system for balancing charge to a plurality of batteries. The system comprises a plurality of series connected batteries and a plurality of energy storage circuits. The system also includes means for alternately connecting each energy storage circuit across a respective one of the batteries and in parallel with each other.

The present invention also provides a battery charge balancing system comprising a plurality of series-connected batteries each having a first and second terminal and a plurality of switching circuits equal in number to the plurality of batteries, each switching circuit coupled to a respective one of the batteries. Each switching circuit further comprises an energy storage circuit having a first and second termination; a first switch coupled between the first termination of the energy storage circuit and the first terminal of the respective battery; a second switch coupled between the second termination of the energy storage circuit and the second terminal of the respective battery; a third switch coupled between the first termination of the energy storage circuit and a first common point; and a fourth switch coupled between the second termination of the energy storage circuit and a second common point. The first common points of the switching circuits are coupled together and the second common points of the switching circuits are also coupled together.

Battery charge balancing systems and methods according to the present invention allow energy-efficient charge balancing while overcoming other disadvantages of prior art charge balancing systems. In doing so, the present invention provides advantages over the prior art.

DETAILED DESCRIPTION OF THE PREFERRED EMBODIMENT

Figure 1:
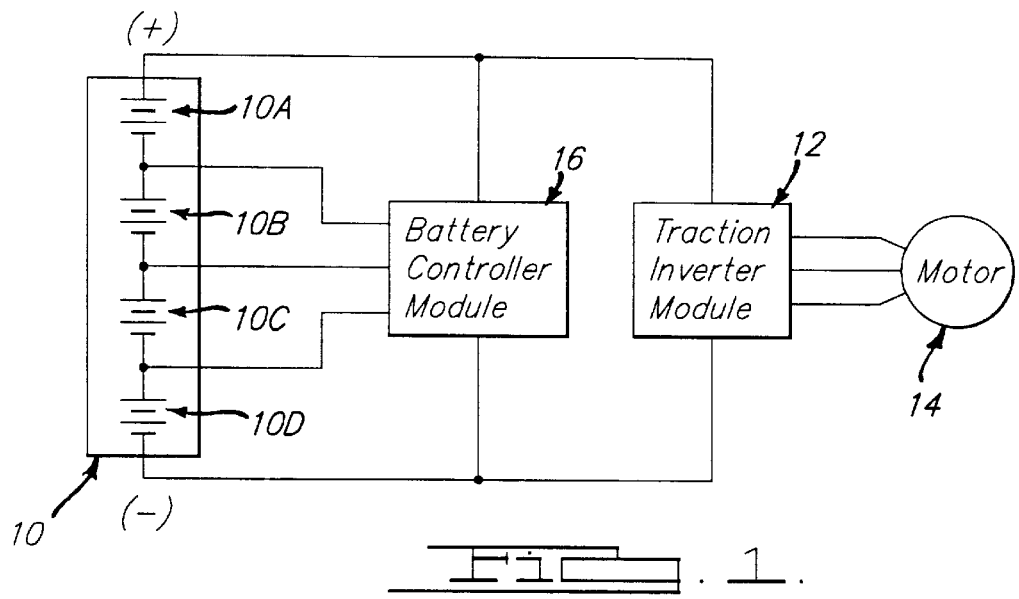
FIG. 1 is a block diagram of the principal components of the powertrain of an electric vehicle.

Refer first to FIG. 1. There are illustrated the principal components of the powertrain of an electric vehicle. A plurality of series-connected batteries 10A–10D in a battery pack 10 are coupled to a traction inverter module 12. Although four batteries 10A–10D are shown, any number appropriate for the particular application may be selected. Traction inverter module 12 contains power switching devices such as bipolar junction transistors for converting the DC energy provided by batteries 10A–10D into AC energy for traction motor 14. Traction motor 14, preferably a three-phase induction motor, provides motive power for the electric vehicle. In the preferred partitioning for this system, traction inverter module 12 further includes a microprocessor which performs motor control of motor 14 by providing switching signals for the switching devices within traction inverter module 12. However, such motor control can just as easily be performed by a separate control module which interfaces with traction inverter module 12.

Also coupled to batteries 10A–10D is a battery controller module (BCM) 16. BCM 16 is preferably a microprocessor-based device having a microprocessor 17 with sufficient microcomputer resources (throughput, memory, inputs, outputs and the like) to perform the functions ascribed to it herein. As is apparent in FIG. 1, BCM 16 has connections across each of batteries 10A–10D. Therefore, BCM 16 can measure the voltage across each of batteries 10A–10D.

Figure 2:
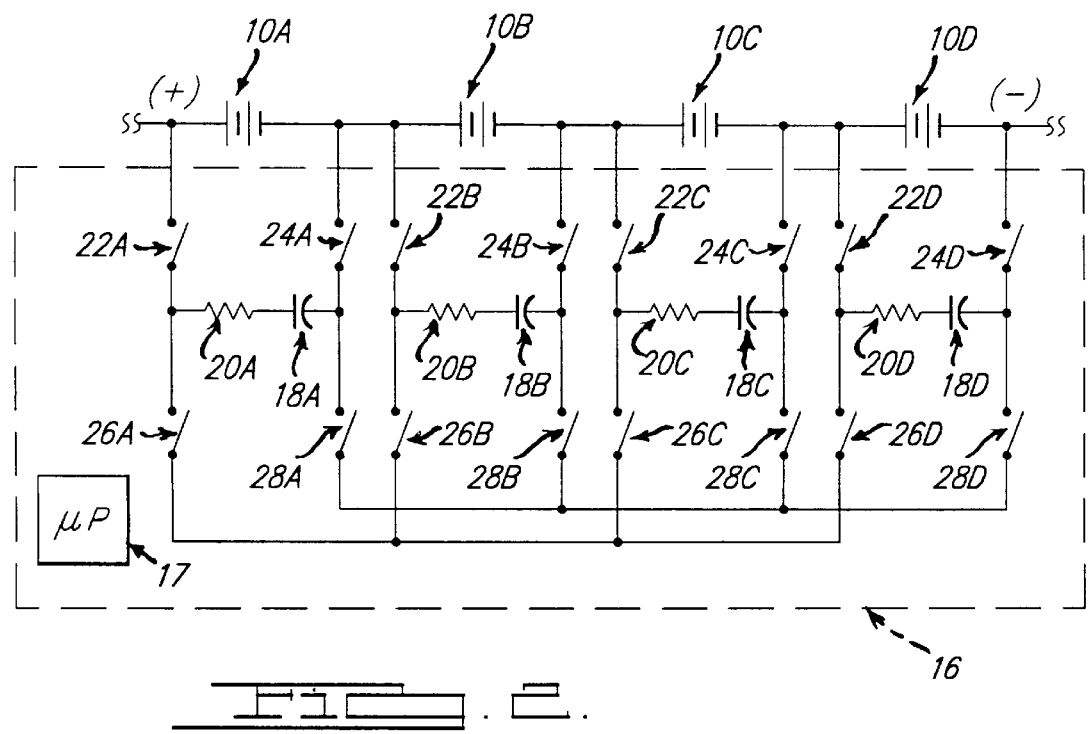
FIG. 2 is a schematic showing charge balancing circuitry within battery controller module 16 of FIG. 1.

Refer now additionally to FIG. 2. BCM 16 includes the charge-balancing circuitry shown therein. Capacitors 18A–18D are provided, each in series with a respective resistor 20A–20D. Switches 22A–22D and 24A–24D are configured such that when switches 22A–22D and 24A–24D are closed, each capacitor 18A–18D is placed in parallel with a respective battery 10A–10D. Switches 22A–22D and 24A–24D are any switching means appropriate for this application, including relays and solid state switches such as transistors.

Switches 26A–26D and 28A–28D are configured such that when switches 26A–26D and 28A–28D are closed, capacitors 18A–18D are coupled in parallel with each other. Again, switches 26A–26D and 28A–28D are any switching means appropriate for this application.

Switches 22A–22D, 24A–24D, 26A–26D and 28A–28D are, of course, under the control of microprocessor 17, which performs algorithms as described below for charge-balancing of batteries 10A–10D.

Balancing of the charges of batteries 10A–10D is performed as follows. (Assume that capacitors 18A–18D begin in an uncharged state.) Switches 22A–22D and 24A–24D are closed, with switches 26A–26D and 28A–28D open. Capacitors 18A–18D are thus each placed across a respective battery 10A–10D. Therefore, each capacitor 18A–18D will charge through its respective resistor 20A–20D to the voltage of the respective battery 10A–10D.

After providing sufficient time for capacitors 18A–18D to charge (several R-C time constants, say), switches 22A–22D and 24A–24D are opened. Switches 26A–26D and 28A–28D are then closed, placing capacitors 18A–18D in parallel with each other. After a sufficient time, their charges will equalize through resistors 20A–20D. Switches 26A–26D and 28A–28D are then opened.

Switches 22A–22D and 24A–24D are then again closed. With capacitors 18A–18D having equal voltages (that voltage being about the average of the voltages of batteries 10A–10D), capacitors 18A–18D will tend to equalize the voltages of batteries 10A–10D. If a particular capacitor 18A–18D has a voltage higher than its respective battery 10A–10D, the capacitor will provide charge to that battery. If the capacitor has a lower voltage than its respective battery, the capacitor will draw charge from its respective battery. The result is an improvement in the charge balance of batteries 10A–10D.

The switching sequence described above may be repeated at a predetermined rate. Or, the sequence may be begun and repeated only when BCM 16 senses a charge imbalance of a particular severity among batteries 10A–10D. Also, the battery charge balancing method described here may be performed when batteries 10A–10D are being charged from an external charger, when they are discharging to provide power to motor 14, and/or when batteries 10A–10D are quiescent (i.e., neither charging nor discharging).

In another method to effect charge balance of batteries 10A–10D, BCM 16 can control its switches to place some or all of capacitors 18A–18D across a single battery 10A–10D which is measured by BCM 16 to have higher charge than another battery 10A–10D. If this battery is battery 10A, for example, switches 22A, 24A, 26A–26D and 28A–28D could be closed. Capacitors 18A–18D would then charge in parallel from battery 10A. Then, if the charge is to be transferred to battery 10D, switches 22A and 24A will be opened and switches 22D and 24D will be closed. The charge will then transfer to battery 10D.

Various other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

What is claimed is:

1. A method for balancing charge of a plurality of series-connected batteries, said method comprising:

(a) coupling each of a plurality of energy storage circuits across a respective one of said batteries;

(b) coupling said plurality of energy-storage circuits in parallel with one another and across none of said batteries; and alternately repeating steps (a) and (b).

2. A method as recited in claim 1, wherein alternately repeating steps (a) and (b) further comprises alternately repeating steps (a) and (b) at a predetermined rate.

3. A method as recited in claim 1, further comprising measuring variables representing relatives state of charge of said batteries;

wherein alternately repeating steps (a) and (b) further comprises alternately repeating steps (a) and (b) at a rate which is a function of charge imbalance among said batteries.

4. A method as recited in claim 1, wherein alternately repeating steps (a) and (b) further comprises alternately repeating steps (a) and (b) when said batteries are being discharged to a device external to said plurality of series-connected batteries and said plurality of energy storage circuits.

5. A method as recited in claim 1, wherein alternately repeating steps (a) and (b) further comprises alternately repeating steps (a) and (b) when said batteries are being discharged to provide power to an electric motor.

6. A method as recited in claim 1, wherein alternately repeating steps (a) and (b) further comprises alternately repeating steps (a) and (b) when said batteries are being charged from a device external to said plurality of series-connected batteries and said plurality of energy storage circuits.

7. A method as recited in claim 1, wherein alternately repeating steps (a) and (b) further comprises alternately repeating steps (a) and (b) when said batteries are neither being charged nor discharged.

8. A system for balancing charge to a plurality of batteries, said system comprising:

a plurality of series connected batteries;

a plurality of energy storage circuits;

means for alternately connecting each said energy storage circuit across a respective one of said batteries and in parallel with each other across none of said batteries.

9. A system as recited in claim 8, further comprising means for measuring voltages across each of said batteries;

wherein said alternate connection means further comprises means for performing said alternate connections at a rate which is a function of said measured voltages.

10. A system as recited in claim 8, wherein said alternate connection means further comprises means for performing said alternate connections at a predetermined rate.

11. A system as recited in claim 8, wherein said alternate connection means further comprises means for performing said alternate connections when said batteries are being charged from a charger external to said system.

12. A method as recited in claim 8, wherein said alternate connection means further comprises means for performing said alternate connections when said batteries are being discharged to a device external to said plurality of series-connected batteries and said plurality of energy storage circuits.

13. A system as recited in claim 8, further comprising an electric motor, and wherein said alternate connection means further comprises means for performing said alternate connections when said batteries are being discharged to provide power to said motor.

14. A system as recited in claim 8, wherein said alternate connection means further comprises means for performing said alternate connections when said batteries are being neither charged nor discharged.

15. A battery charge balancing system comprising:

a plurality of series-connected batteries each having a first and second terminal;

a plurality of switching circuits equal in number to said plurality of batteries, each said switching circuit coupled to a respective one of said batteries and further comprising:

an energy storage circuit having a first and second termination;

a first switch coupled between said first termination of said energy storage circuit and the first terminal of said respective battery;

a second switch coupled between said second termination of said energy storage circuit and the second terminal of said respective battery;

a third switch coupled between said first termination of said energy storage circuit and a first common point;

a fourth switch coupled between said second termination of said energy storage circuit and a second common point;

wherein said first common points of said switching circuits are coupled together and said second common points of said switching circuits are coupled together.

16. A battery charge balancing system as recited in claim 15, further comprising means for controlling said switching circuits to alternately connect said energy storage circuits across their respective batteries and in parallel with each other.

17. A battery charge balancing system as recited in claim 15, further comprising means for controlling said switching circuits to alternately connect a plurality of said energy storage circuits across a first said battery and then across a second said battery, to transfer charge from said first battery to said second battery.

\* \* \* \* \*